United States Patent [19]
Gregory et al.

[11] Patent Number: 5,559,415
[45] Date of Patent: Sep. 24, 1996

[54] INTEGRATOR MANAGEMENT FOR REDUNDANT ACTIVE HAND CONTROLLERS

[75] Inventors: William W. Gregory, St. Petersburg; Wayne E. Lance, Largo; Jeffrey W. Hegg, North Redington Beach, all of Fla.

[73] Assignee: Honeywell Inc., Minneapolis, Minn.

[21] Appl. No.: 269,275

[22] Filed: Jun. 30, 1994

[51] Int. Cl.⁶ .................................................. G05B 11/36
[52] U.S. Cl. ........................... 318/609; 318/610; 318/34; 318/51; 318/53; 318/77
[58] Field of Search ............................ 318/609, 610, 318/34, 51, 53, 77

[56] References Cited

U.S. PATENT DOCUMENTS

| | | | |
|---|---|---|---|
| 5,272,423 | 12/1993 | Kim | 318/609 |
| 5,278,485 | 1/1994 | Kim | 318/609 |
| 5,365,153 | 11/1994 | Fujita et al. | 318/34 |
| 5,373,223 | 12/1994 | Akagi et al. | 318/609 |

*Primary Examiner*—William M. Shoop, Jr.
*Assistant Examiner*—Karen Masih
*Attorney, Agent, or Firm*—Gregory A. Bruns

[57] ABSTRACT

A redundant active hand controller system has first and second motors connected to a common shaft. A compensator which differentiates a motor command signal from a first proportional and integral controller, differentiates a motor command signal from a second proportional and integral controller and subtracts the first differentiated motor command signal from the second differentiated motor command signal to provide a correction signal. The correction signal is summed with the error signal into the first proportional and integral controller to correct for slight differences in the integral control function of the first and second proportional and integral controllers.

6 Claims, 6 Drawing Sheets

INTEGRATOR MANAGEMENT FOR REDUNDANT ACTIVE HAND CONTROLLERS

BACKGROUND OF THE INVENTION

This invention relates generally to a control system of the type wherein manual control devices such as a control stick or hand controller are provided which have an electro simulated variable rate feel. These hand controllers use a torque loop with proportional and integral control to achieve the required force-displacement characteristic of the hand grip. Hand controller systems having this electro simulated variable rate feel are commonly referred to as active hand controller systems. Hand controller systems are described in issued U.S. Pat. No. 5,264,768 having an issue date of Nov. 23, 1993 and issued U.S. Pat. No. 5,291,113 having and issue date of Mar. 1, 1994 which are hereby incorporated by reference.

The related inventions referenced hereinbefore utilize electric motors to produce desired hand controller force and position response. These systems require sensors which can provide force and position signals.

Aircraft and spacecraft flight control systems have a critical role in flight safety and therefore have stringent performance and reliability requirements. Systems are designed to be fault tolerant, i.e., the system can continue to operate with a fault. Fault tolerant systems can be designed using a parallel reliability concept so that in the event of the failure of a single component a duplicate or paralleled component takes over the function of the failed component. Electronic subsystems or modules are routinely provided in redundant parallel arrangements. Many aircraft flight control systems are designed to provide four parallel modules for quadruple redundancy. In active hand controller systems, for various reasons, it is not practical to provide four motors for each axis of a hand controller. However commercial aircraft include a separate hand controller or sidestick for each of the pilot and copilot. If each of the sidesticks are provided with two motors coupled to a common shaft per each axis, then a form of quadruple redundancy has been provided.

Integral control acts such that the feedback error signal is integrated to generate a command which corrects the error signal to a null condition. In an active hand controller the feedback error signal is corrected by a motor applying torque to a shaft which is configured to apply a force to a hand grip. In a redundant hand controller two motors are configured to apply a torque to one shaft. Redundant integral controllers receive two separate feedback error signals that are separately integrated. This results in two separate motor command signals which are applied to the two motors connected to a common motor shaft. Both integrators will not be capable of nulling their individual error signals simultaneously due to slight variations in each redundant path. Hence, one of the integrators will ramp-off, or oscillations will result between the redundant motors.

Thus a need exists for an integration management system that allows both motors to operate at a null condition.

SUMMARY OF THE INVENTION

The present invention solves these and other needs by providing in a first aspect an integration compensator which differentiates a motor command signal from a first proportional and integral controller, differentiates a motor command signal from a second proportional and integral controller and subtracts the first differentiated motor command signal from the second differentiated motor command signal to provide a correction signal. The correction signal is summed with the error signal into the first proportional and integral controller to correct for slight differences in the integral control function of the first and second proportional and integral controllers.

In a second aspect, the first proportional and integral controller has a redundant controller and the second proportional and integral controller has a redundant controller.

DETAILED DESCRIPTION

Figure 1:
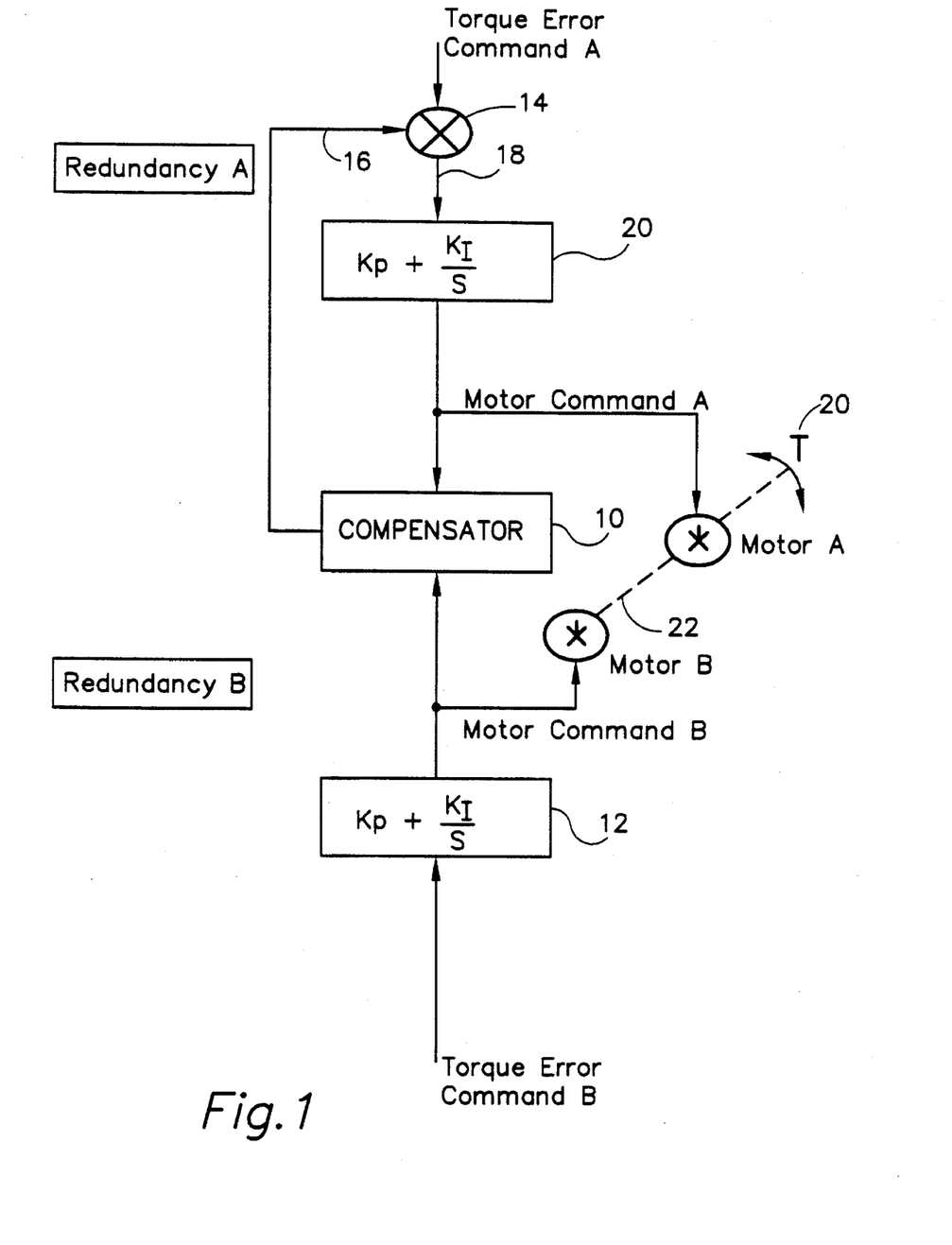
FIG. 1 is a functional block diagram illustrating the present invention.

FIG. 1 is a diagram of an active hand control system including a hand grip 20 coupled to a motor A and a Motor B which are mechanically connected to a common shaft 22.

Figure 2:
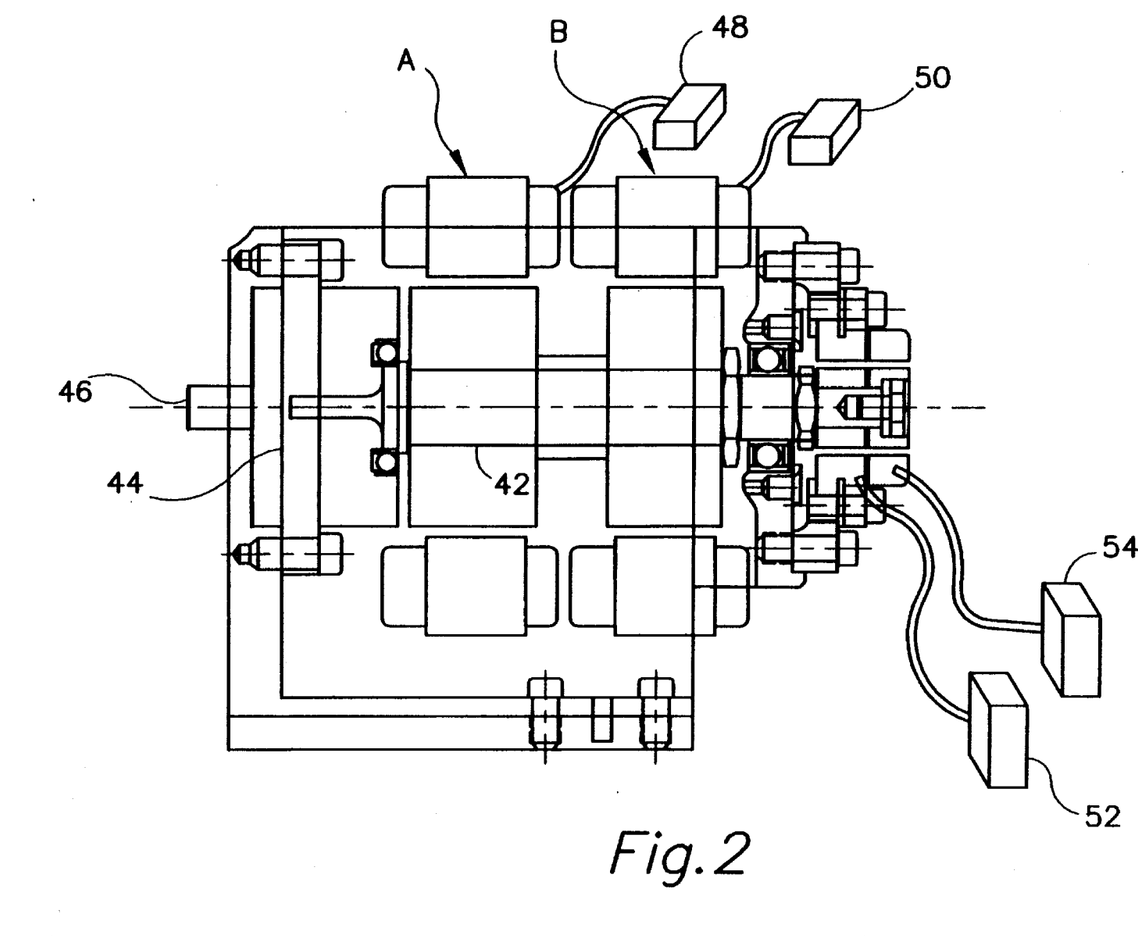
FIG. 2 is a section drawing of two motors connected to a common shaft.

A sectional drawing showing an arrangement for connecting two motors to a common shaft and the associated electrical connections to the motors is shown in FIG. 2 where motor A and motor B are shown having a common motor shaft 42. Gearhead 44 is driven by shaft 42 and has an output spline 46 which would be coupled to a control stick. Connectors 48 and 50 provide motor command signals to the motors. Commutation sensors (e.g., Hall effect sensors, resolvers) A and B and their respective associated connectors 52 and 54 are also shown.

Referring again to FIG. 1, redundancy B includes a Proportional and Integral (PI) controller 12 which receives a torque error command B and provides a motor command B to motor B and to compensator or integrator compensator 10. Redundancy A has a summing junction 14 which receives a torque error command A and offset correction 16 and provides signal 18 to PI controller 20. The output of PI controller 20 is motor command A which is applied to motor A and to compensator 10.

Figure 3:
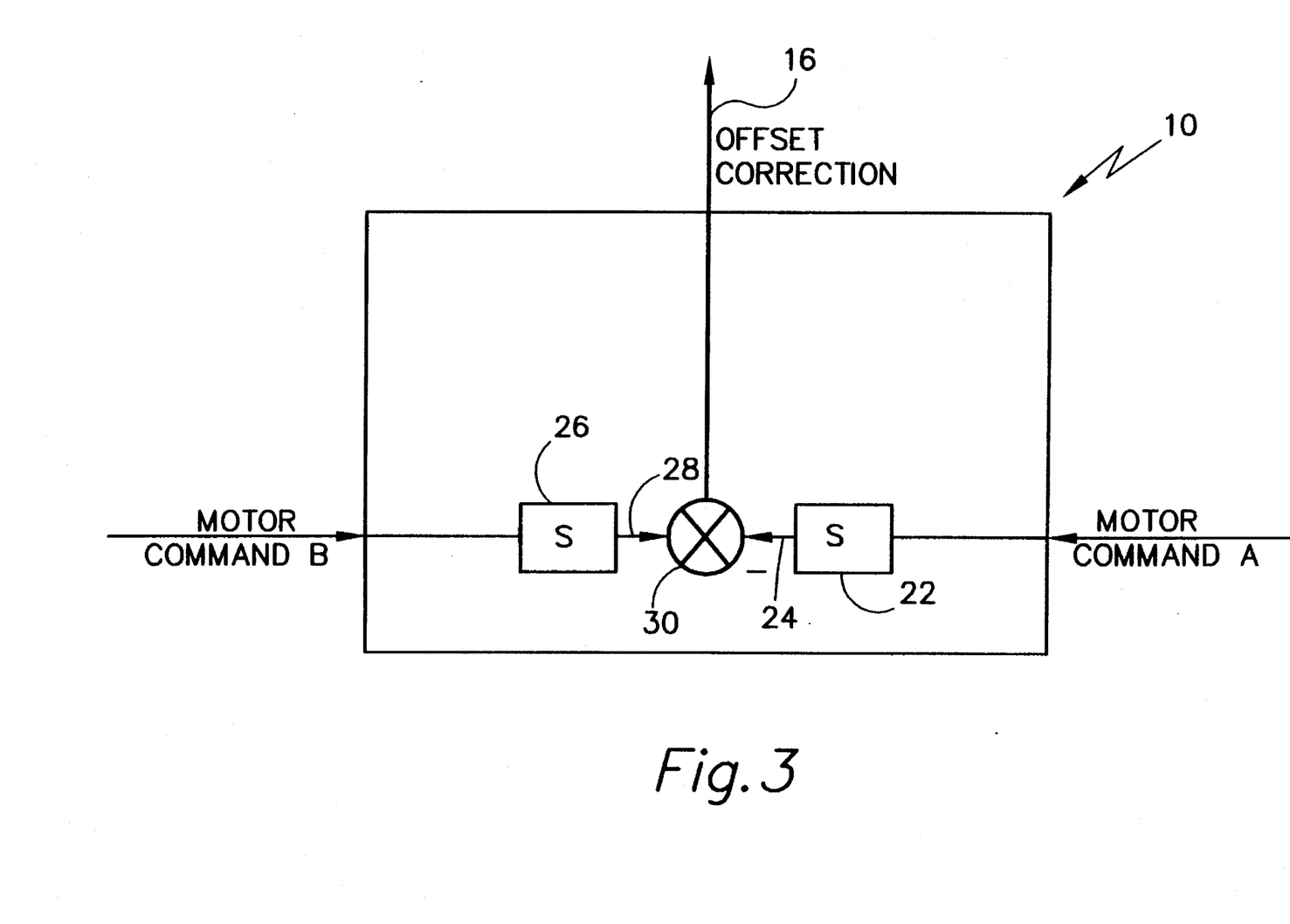
FIG. 3 is a detailed functional drawing of the compensator of FIG. 1.

The functional operation of compensator 10 is shown in FIG. 3 with the differential function shown in La place Transform notation. In accordance with the principles of the present invention compensator 10 accepts motor command A and motor command B. Differentiator 22 differentiates motor command A to provide differentiated signal 24. Differentiator 26 differentiates motor command signal B to provide differentiated signal 28. Summing junction 30 subtracts signal 24 from signal 28 and provides offset correction 16. The differentiation and summing functions are performed with well known operational amplifier configurations.

The need for the present invention can be explained by considering the situation that would exist if there were no compensator 10 in FIG. 1, that is if motor command A were applied to Motor A without the compensation provided by the present invention. In this situation, when there is some small difference in the integrators of PI controller 12 and PI controller 20, the two PI controllers will then be running independently with each applying a torque through the motors to a common shaft and they will not be able to achieve a null condition. Hence, the integrators will keep applying more torque to null the error, causing a ramping off condition or oscillations. The integration functions are implemented with operational amplifiers, and differences in the integrators arise due to offsets inherent in the operational amplifiers and slight variations in the integral gain.

An appreciation of the present invention may be had by considering the effect of the differention. The function of Proportional and integral controller 20 may be represented as $$K_p^A + \frac{K_I^A + \text{Offset} A}{S}$$

where $K_p$ is the proportional gain and $K_I$ is the integral gain and offset A is the offset inherent in PI controller 20. Similarly, the function of PI controller 12 may be represented by $$K_p^B + \frac{K_I^B + \text{Offset} B}{S}$$

where $K_p$ is the proportional gain, $K_I^B$ is the integral gain and offset B is the offset inherent in PI controller 12. Differentiation 22 then results in signal 24 or $K_I^A$+Offset A and differentiation 26 then results in signal 28 of $K_I^B$+Offset B and the subtraction in summing junction 30 of signal 24 results in offset correction signal 16 which accounts for differences in $K_I^A$ and $K_I^B$, and the inherent Offsets A and B. Offset correction 16 can be summed into the input of one redundancy to allow the PI controllers to operate at a null condition. This compensation technique also applies when no proportional control is employed (ie $K_p$=0) and if a parallel proportional control is applied with the integral control. The PI controller which has the correction signal summed thereby actively tracks the nulling of the other integrators.

Figure 3A:
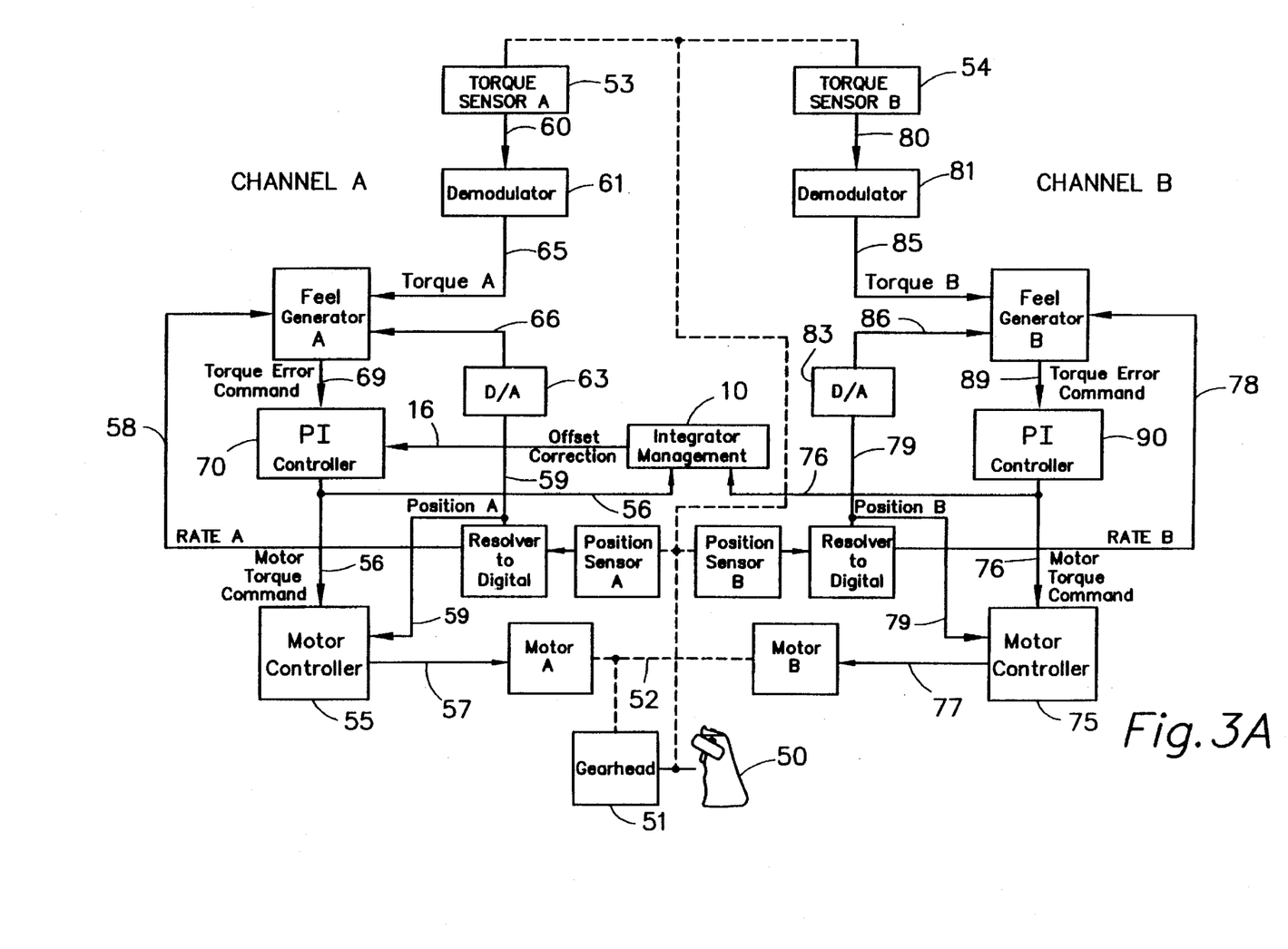
FIG. 3a is a functional implementation of a dual redundant configuration using the integrator management of the present invention.

The present invention has been described with reference to two motors on a common shaft and two PI controllers. FIG. 3a is a dual redundant functional diagram that includes implementation of the integrator management function of the present invention into a complete active hand controller system. As shown, the integrators of each redundant channel A and B must be compensated relative to each other.

A hand grip 50 is connected to gearhead 51 typically through some form of gimbal arrangement (not shown). Gearhead 51 is physically connected to a common motor shaft illustrated in FIG. 3a by dashed line 52. Torque sensor 53 and torque sensor 54 are physically connected to a gimbal arrangement between the grip and gearhead (not shown).

Motor controller 55 accepts motor torque command 56 and position signal 59 to provide drive signal 57 to motor A. Position sensors and resolver to digital converter provide rate signal 58 and position signal 59. Torque signal 60 is provided to demodulator 61 which provides torque A signal 65. Position signal 59 is provided to D/A 63 which provides position A signal 66.

Feel generator A accepts position signal 66, velocity signal 58, and torque signal 65. Feel generator A also provides torque error command signal 69 to proportional and integral (PI) controller 70. The feel generators determine the feel of hand controller 50 to an operator so that the desired force vs. displacement characteristic of hand controller 50 is felt by the operator. Integrator management block 10 represents the functions of the present invention.

Channel A and Channel B each provide, completely and independently, all control functions necessary to provide the desired torque on common shaft 52. In the event that either channel should fail, the remaining channel will continue to provide the desired torque on common shaft 52.

Referring to redundant channel B, motor controller 75 accepts motor torque command 76 and position signal 79 to provide drive signal 77 to motor B. Position sensor B and the resolver to digital converter provide rate signal 78 and position signal 79. Torque signal 80 is provided to demodulator 81 which provides torque B signal 85. Position signal 79 is provided to D/A 83 which provides position B signal 86.

Feel generator B accepts position signal 86, velocity signal 78, and torque signal 85. Feel generator B also provides torque error command signal 89 to proportional and integral (PI) controller 90. The feel generators determine the feel of hand controller 50 to an operator. Integrator management block 10 represents the functions of the present invention.

Figure 4:
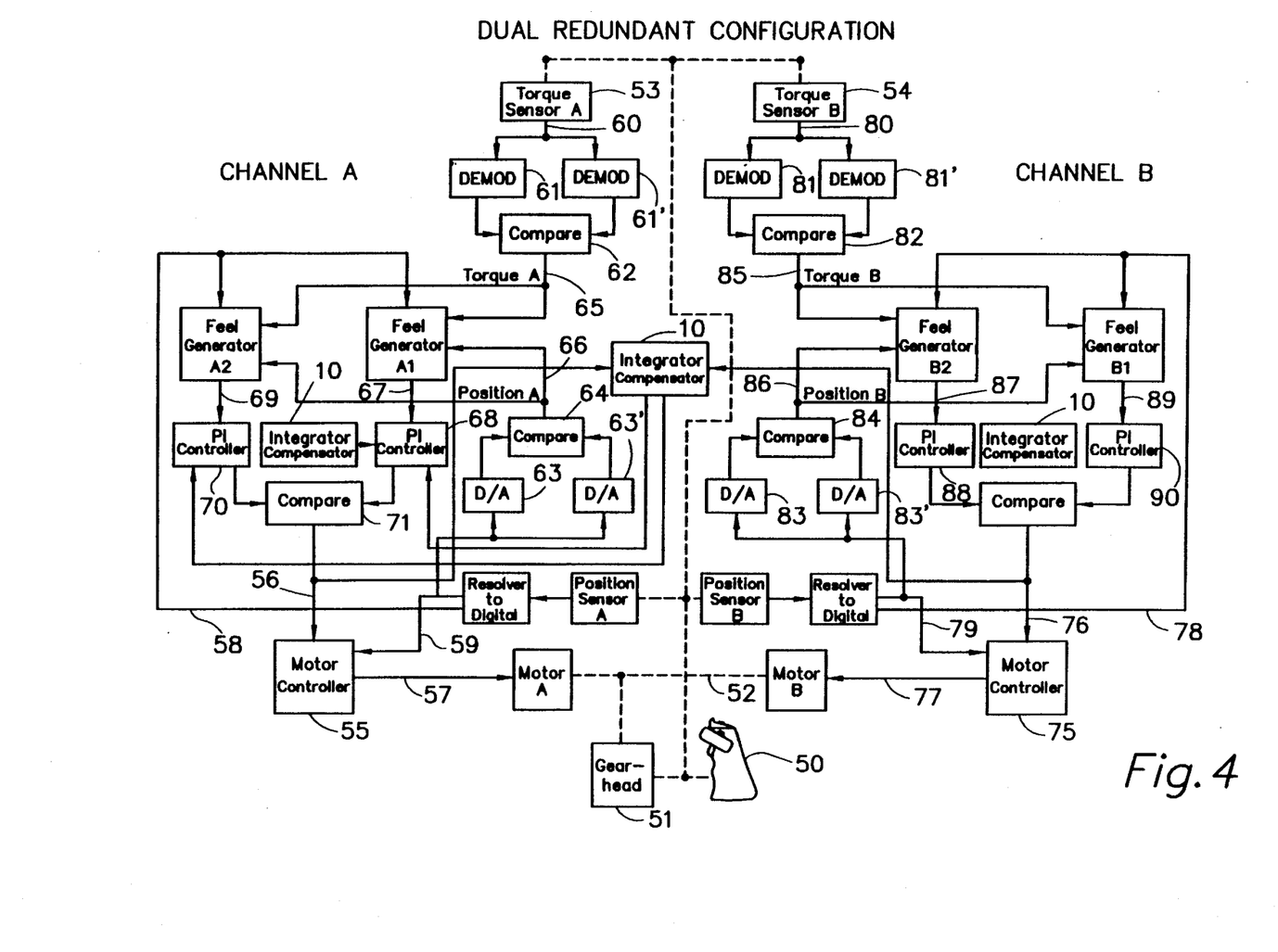
FIG. 4 is a dual path functional drawing of a dual redundant configuration using the integrator management of the present invention.

The present invention has been described with reference to two motors on a common shaft and only two PI controllers. Many systems will require that additional redundancy be designed into the control system. FIG. 4 is a top level functional diagram that includes additional redundancy and the integrator management function of the present invention. The same numerals are used to identify items as used in FIG. 3a to identify a similar item. In FIG. 4, each redundant channel has the capability of self detecting failure by cross command signals in the block then the two motor commands are combined into one signal, i.e., A1, A2, and B1, B2. Therefore, the integrator of these parallel paths in each redundant channel must be compensated relative to each other.

A hand grip 50 is connected to gearhead 51 typically through some form of gimbal arrangement (not shown). Gearhead 51 is physically connected to a common motor shaft illustrated in FIG. 4 by dashed line 52. Torque sensor 53 and torque sensor 54 are physically connected to the gimbal arrangement between the grip and gearhead (not shown).

Motor controller 55 accepts motor torque command 56 and position signal 59 to provide drive signal 57 to motor A. Position sensors and resolver to digital converter provide rate signal 58 and position signal 59. Channel A illustrates the design approach of parallel redundancy and will now be explained. Torque signal 60 is provided to demodulator 61 and demodulator 61' which have their outputs compared in compare circuit 62 which provides torque A signal 65.

Position signal 59 is provided to D/A 63 and D/A 63' which have their outputs compared in compare circuit 64 which provides position A signal 66.

Feel generator A1 accepts position signal 66, velocity signal 58, and torque signal 65. Feel generator A1 also provides torque error command signal 67 to proportional-integral (PI) controller 68. Feel generator A2 accepts position signal 66, velocity signal 58, and torque signal 65. Feel generator A2 provides torque error command signal 69 to proportional-integral (PI) controller 70. The feel generators determine the feel of hand controller 50 to an operator so that the desired force vs. displacement characteristic of hand controller 50 is felt by the operator. The output of PI controller 68 and PI controller 70 are compared in compare circuit 71 to assure that they agree within some threshold value. Integrator management block 10 represents the functions of the present invention.

Channel A and Channel B each provide, completely and independently, all control functions necessary to provide the desired torque on common shaft 52. In the event that either channel should fail, the remaining channel will continue to provide the desired torque on common shaft 52. Within each channel, additional redundancy is provided as shown in FIG. 4, for example, redundant feel generator and PI controllers are provided.

Referring to redundant channel B, motor controller 75 accepts motor torque command 76 and position signal 79 to provide drive signal 77 to motor B. Position sensors and resolver to digital converter provide rate signal 78 and position signal 79. Channel B illustrates the design approach of parallel redundancy and will now be explained. Torque signal 80 is provided to demodulator 81 and demodulator 81' which have their outputs compared in compare circuit 82 which provides torque B signal 85.

Position signal 79 is provided to D/A 83 and D/A 83' which have their outputs compared in compare circuit 84 which provides position B signal 86.

Feel generator B2 accepts position signal 86, velocity signal 78, and torque signal 85. Feel generator B2 also provides torque error command signal 87 to proportional-integral (PI) controller 88. Feel generator B2 accepts position signal 86, velocity signal 78, and torque signal 85. Feel generator B2 provides torque error command signal 89 to proportional-integral (PI) controller 90. The feel generators determine the feel of hand controller 50 to an operator. Integrator compensator block 10 represents the functions of the present invention.

Figure 5:
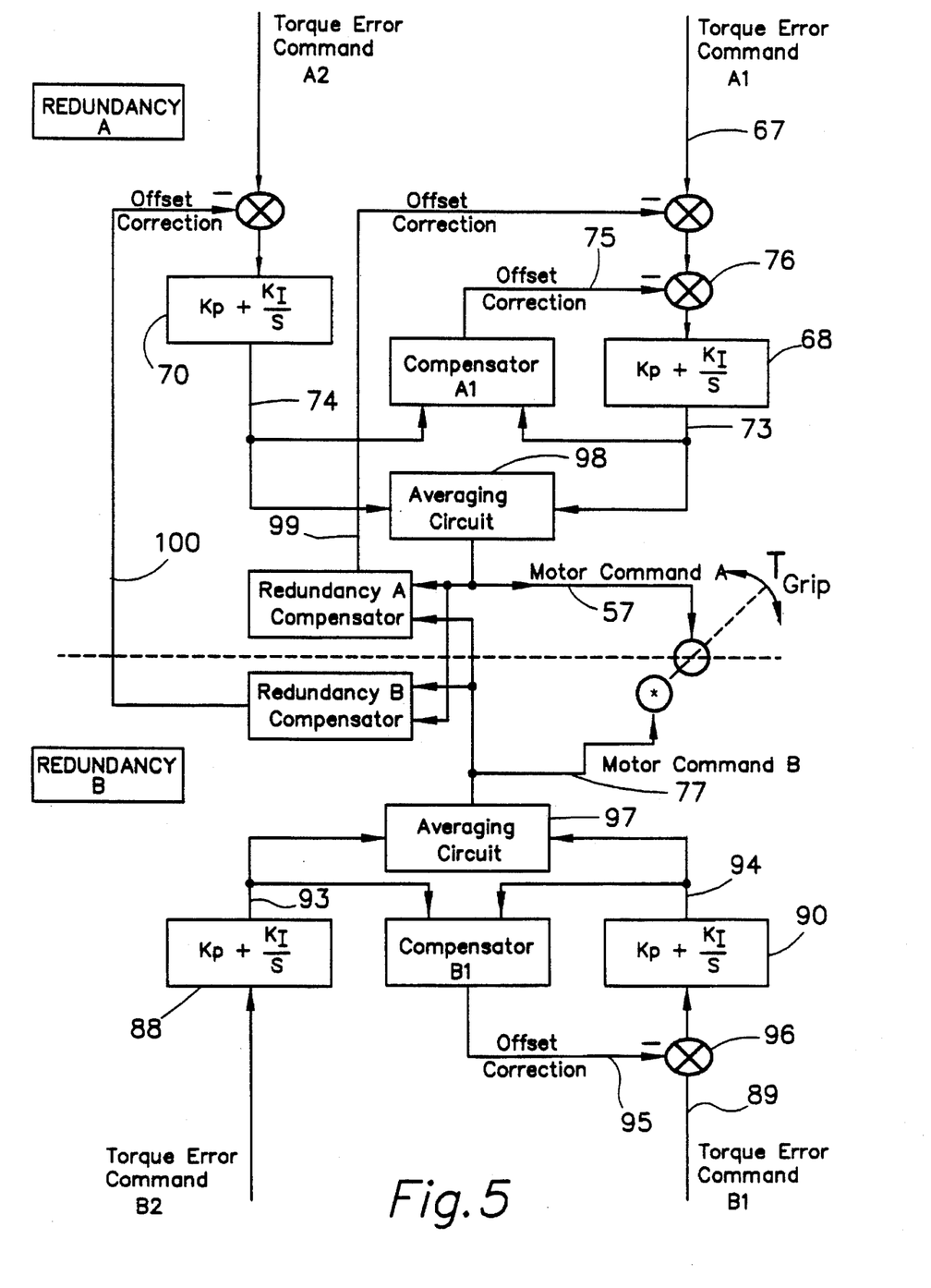
FIG. 5 is a functional block diagram illustrating the integrator management function of the present invention applied to the dual path, dual redundant system of FIG. 4.

FIG. 5 illustrates the use of the present invention in the dual redundant configuration of FIG. 4. In FIG. 4 an integrator compensator 10 is shown within channel A, within channel B and between channel A and channel B. In FIG. 5, additional details of the application of compensator 10 to the configuration of FIG. 4 are illustrated.

In FIG. 5, compensator B1 differentiates output 93 from PI controller 88, differentiates output 94 from PI controller 90, subtracts differentiated output 94 from differentiated output 93 and sums offset correction 95 into summary junction 96 to compensate torque error command B1 for slight differences between PI controller 88 and PI controller 90. Note that signal 93 and signal 94 are then averaged with known operational amplifier circuitry in functional block 97 which provides motor command B signal 77 to motor B. In FIG. 5, torque error command B2 is the only error command that remains uncompensated, hence all other integrators are tracking the null point of the B2 integrator.

Compensator A1 differentiates output 73 from PI controller 68, differentiates output 74 from PI controller 70, subtracts differentiated output 73 from differentiated output 74 and sums offset correction 75 into summing junction 76 to compensate torque error command 67 for slight differences between PI controller 70 and PI controller 68.

Signal 73 and signal 74 are then averaged with known operational amplifier circuitry in functional block 98 which provides motor torque command 57 to motor A.

Redundancy A compensator and redundancy B compensator each have motor command 57 and motor command 77 as inputs and have outputs 99 and 100 respectively, which are nominally equal outputs.

Redundancy A compensator and redundancy B compensator each differentiate combined motor command signal 57, differentiate combined motor command signal 77, subtract differentiated signal 57 from differentiated signal 77 to provide an offset correction signal to compensate for slight differences between PI controller 88 and each of PI controllers 68 and 70. Offset correction signal 99 which is summed with torque error command 67 in summing junction 101 corrects for differences in combined motor command signal 77 and combined motor command signal 57 due to slight differences in PI controller 68 and PI controller 88.

Offset correction 100 which is summed with torque error command 69 in summing junction 102 corrects for differences in combined motor command signals 77 and 57 due to slight differences in PI controller 70 and PI controller 88.

An important advantage of the present invention is that, in addition to correcting differences between the integration paths A1 and B1, compensator A1 will correct for unavoidable minor differences between the redundancy A compensator and the redundancy B compensator. This feature allows the use of parallel compensator to maintain the separation of channels A & B.

We claim:

1. A redundant active hand controller system, comprising:

a control stick;

a first motor;

a second motor;

a common shaft mechanically connecting said first motor and said second motor, said shaft coupled to said control stick;

a control redundancy A having at least a first proportional and integrating controller having a first error signal input and providing a first motor command signal, said first proportional and integrating controller having a first integrating control function;

a control redundancy B having at least a second proportional and integrating controller having a second error signal input and providing a second motor command signal, said second proportional and integrating controller having a second integrating control function;

first compensating means for differentiating said first motor command signal, for differentiating said second motor command signal and for subtracting said differentiated first motor command signal from said differentiated second motor command signal to provide a first offset correction signal; and means for summing said first error signal and said first offset correction signal into said first proportional and integral controller to allow the first proportional and integrating controller and the second proportional and integrating controller to operate at a null condition.

2. System of claim 1 wherein said first compensating means is used for differentiating a combined first motor control signal, differentiating a combined second motor control signal, subtracting said differentiated first combined motor signal from said differentiated second combined motor signal to provide said first offset correction signal and said system further comprises:

said redundancy B having a third proportional and integrating controller providing a third motor command signal;

said redundancy B having a second compensating means and a second summing means to compensate for slight differences in said third integrating control function and said second integrating control function;

means for combining said second motor command signal and said third motor command signal to provide said first combined motor command signal said redundancy A having a fourth proportional and integrating controller providing a fourth motor command signal;

said redundancy A having a third compensating means and a third summing means to compensate for slight differences in said fourth integrating control function and said first integrating control function;

means for combining said first motor control signal and said fourth motor command signal to provide said second combined motor command signal;

said redundancy A having a fourth compensating means for differentiating a combined first motor command signal, differentiating a combined second motor control signal, subtracting said differentiated first combined motor signal from said differentiated second combined motor signal to provide a fourth offset correction; and said redundancy A having a fourth summing means for summing said fourth error signal and said fourth offset correction into said fourth proportional and integrating controller.

3. A redundant active hand controller system, comprising:

a control stick;

a first motor;

a second motor;

a common shaft mechanically connecting said first motor and said second motor, said shaft coupled to said control stick;

a first PI controller having a first error signal input and providing a first motor command signal;

a fourth PI controller having a fourth error signal input and providing a fourth motor command signal, said first and fourth PI controllers connected for parallel redundancy;

a second PI controller having a second error signal input and providing a second motor command signal;

a third PI controller having a third error signal input and providing a third motor command signal, said second and third PI controllers connected for parallel redundancy;

means for combining said second and third motor command signals to provide a first combined motor command signal;

means for combining said first and fourth motor command signals to provide a second combined motor command signal;

means for adjusting said third error signal input for slight differences between said second integrating control function and said third integrating control function;

means for adjusting said fourth error signal input for slight differences between said first integrating control function and said fourth integrating control function;

means for adjusting said first error signal input for slight differences between said integrating function of said first PI controller and said integrating function of said second PI controller; and means for adjusting said fourth error signal input for slight differences between said integrating function of said second PI controller and said integrating function of said fourth integrating controller.

4. The system of claim 3 wherein said means for adjusting said third error signal input comprises compensating means for differentiating said second motor command signal, differentiating said third motor command signal, and for subtracting said differentiated third motor control signal from said differentiated second motor command signal to provide a first offset correction signal; and means for summing said third error signal and said first offset correction into said third proportional and integral controller.

5. The system of claim 4 wherein said means for adjusting said fourth error signal input comprises:

means for adjusting said fourth error signal input for slight differences between said integrating function of said second PI controller and said integrating function of said fourth integrating controller comprises:

means for differentiating said first combined motor command signal, for differentiating said second combined motor command signal and for subtracting said differentiated second combined motor command signal from said differentiated first combined motor command signal to provide a second offset correction signal; and means for summing said fourth error signal and said second offset correction into said fourth proportional and integral controller.

6. A redundant active hand controller system, comprising:

a control stick;

a first motor;

a second motor;

a common shaft mechanically connecting said first motor and said second motor, said shaft coupled to said control stick;

a control redundancy A having at least a first controller having a first error signal input and providing a first motor command signal, said first controller having a first integrating control function;

a control redundancy B having at least a second having a second error signal input and providing a second motor command signal, said second controller having a second integrating control function;

first compensating means for differentiating said first motor command signal, for differentiating said second motor command signal and for subtracting said differentiated first motor command signal from said differentiated second motor command signal to provide a first offset correction signal; and means for summing said first error signal and said first offset correction signal into said first controller to allow said first controller and said second controller to operate at a null condition.

* * * * *